(12) United States Patent  (10) Patent No.: US 6,499,594 B1
Koch  (45) Date of Patent: Dec. 31, 2002

(54) HOUSING FOR A BINOCULAR

(75) Inventor: Norbert Koch, Brünn (DE)

(73) Assignee: Hensoldt AG, Wetzlar (DE)

( * ) Notice: Subject to any disclaimer, the term of this patent is extended or adjusted under 35 U.S.C. 154(b) by 0 days.

(21) Appl. No.: 09/705,883

(22) Filed: Nov. 6, 2000

(30) Foreign Application Priority Data

Nov. 6, 1999 (DE) .......................... 199 53 391

(51) Int. Cl.⁷ ............................... B65D 85/38

(52) U.S. Cl. .................... 206/316.3; 359/407

(58) Field of Search ................ 359/407, 408, 359/409, 410, 413, 414, 417, 811, 411, 412, 415, 416, 418; 206/316.3, 316.1

(56) References Cited

U.S. PATENT DOCUMENTS

| | | | | |
|---|---|---|---|---|
| 3,314,348 A | * | 4/1967 | Lang | 206/316.2 |
| 4,126,374 A | * | 11/1978 | Maguire | 359/414 |
| 4,436,386 A | * | 3/1984 | Ishibai et al. | 359/417 |
| 6,095,328 A | * | 8/2000 | Smithbaker et al. | 206/316.3 |
| 6,142,636 A | * | 11/2000 | Nemoto et al. | 359/413 |

FOREIGN PATENT DOCUMENTS

DE  2522738  12/1976

* cited by examiner

Primary Examiner—Cassandra Spyrou
Assistant Examiner—Arnel C. Lavarias
(74) Attorney, Agent, or Firm—Walter Ottesen

(57) ABSTRACT

The invention is directed to a housing for a binocular (1) having a hard base body (9) which is encased in a soft outer skin (21). The outer skin (21) is attached with the aid of a latch mechanism.

7 Claims, 6 Drawing Sheets

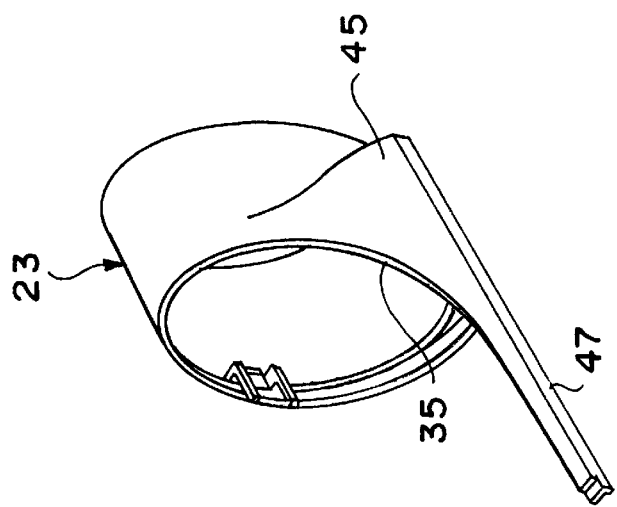
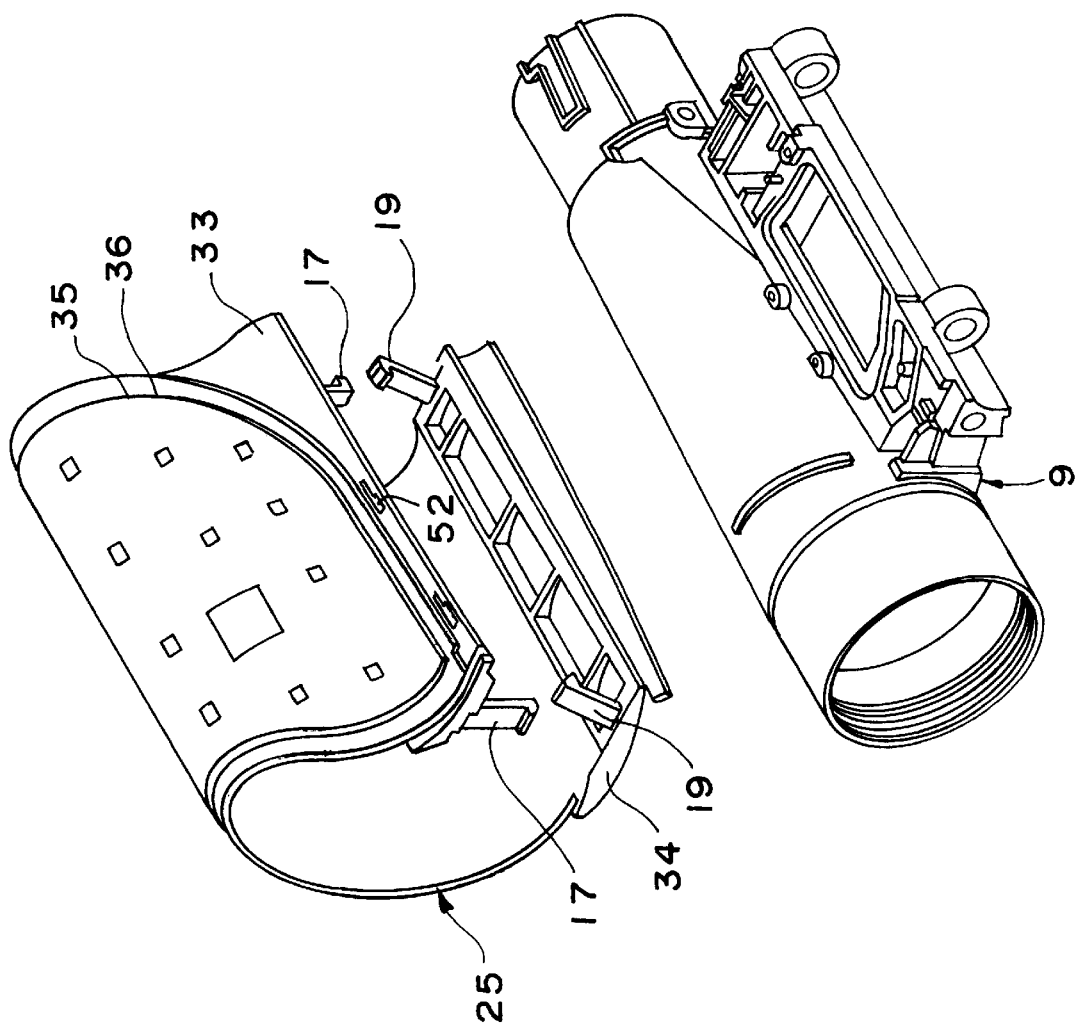
Fig. 4

HOUSING FOR A BINOCULAR

BACKGROUND OF THE INVENTION

German patent publication 2,522,738 discloses a binocular which has a stabilized core. The stabilized core includes an ocular tube as well as an objective tube, an image erection system and a fold mechanism. The stabilized core is completely embedded in a soft plastic. This plastic is provided for impact attenuation. The color of the soft plastic can be influenced or determined by admixed materials. A lacquering of the soft plastic is not needed.

From the brochure of Carl Zeiss, binoculars are known, which have a multi-color housing. The sheathing or covering of the housing is attached with adhesive to the base body of the binocular. It is problematic here that the mutually adjoining edges have to be matched very precisely thereby making manufacture very complex. A covering attached defectively with adhesive cannot be easily corrected so that attaching the covering with adhesive is associated with a high number of rejections during manufacture.

SUMMARY OF THE INVENTION

It is an object of the invention to provide a housing for a binocular which is so improved that the manufacturing costs are reduced.

The housing of the invention is for a binocular having a base. The housing includes: an outer skin; and, a latching mechanism for securing the outer skin to the base.

The required complexity with respect to manufacture is greatly reduced with the provision of attaching an external skin or covering by means of a latching mechanism with the covering surrounding the housing. This is so because gluing of the external skin is not necessary or necessary only at some points because of this latching mechanism.

It has been advantageous to subdivide the external skin into several component segments. One component segment functions as an ocular protective shroud.

In an advantageous embodiment of the latching mechanism, this latching mechanism has latching elements which are made of a hard material.

It has been shown to be advantageous to connect the latching elements tightly to a base body of the binocular. The latching mechanisms engage in cutouts configured in the base body. In this way, a fixed connection between the external skin and the base bodies of the binocular is established.

This type of assembly of the external skin is especially simple. Here, a removal of a non-fitting external skin is possible wherein sometimes the external skin may have to be cut. This means that an incorrectly assembled or attached external skin can be exchanged. This is especially advantageous because fewer parts have to be rejected as defective during manufacture.

It has been shown to be advantageous to connect structural parts with the external skin, with these structural parts being made of a hard material. These structural parts are preferably molded into the external skin. Latching elements are fixedly connected to the structural parts and the latching elements are preferably configured as one piece with the structural parts. More specifically, the latching mechanism also includes latching elements to connect a structural part of the ocular protective shroud to a structural part of the cover.

It has been shown to be advantageous to manufacture the structural parts as well as the external skin by means of injection molding. This is a simple and cost-effective manufacturing method.

In an advantageous embodiment of the invention, the latching elements of the structural parts latch into cutouts which are formed in the base body. It can also be provided that the latch elements engage through the cutouts formed in the base body and latch at the opposite sides.

An advantageous embodiment of the invention provides that two structural parts are tightly connected to a segment of the outer skin which can be characterized as a cover. The structural parts are hinge-connected to each other by means of the cover which is elastic.

BRIEF DESCRIPTION OF THE DRAWINGS

The invention will now be described with reference to the drawings wherein:

FIG. 4 is an exploded perspective view showing one of the base bodies of the binocular as well as a cover unit and ocular protective shroud for mounting on the base body;

DESCRIPTION OF THE PREFERRED EMBODIMENTS OF THE INVENTION

Figure 1:
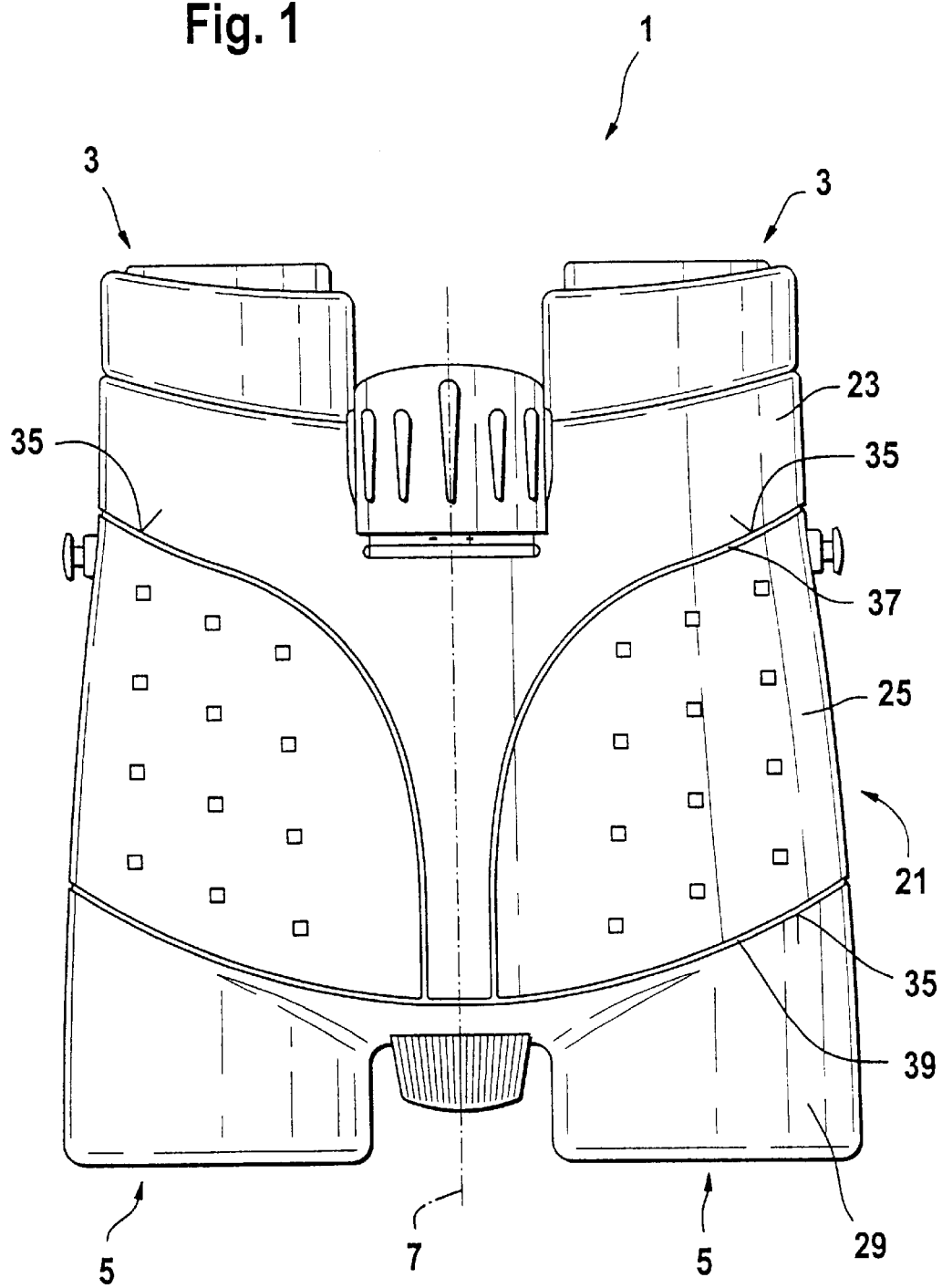
FIG. 1 is a plan view of the binocular incorporated in the housing according to the invention.

The binocular 1 shown in FIG. 1 includes two oculars 3 which are pivotably mounted on a common hinge axis 7. An ocular protective shroud 23 is assigned to each of the oculars and is mounted with the aid of a latch mechanism 16. This ocular protective shroud 23 includes an end facing away from the ocular where a boundary edge 35 is provided against which a cover 25 lies. In the embodiment shown, a groove 37 is conjointly defined by the ocular protective shroud 23 and the adjacent cover 25 at the boundary edge 35. The ocular protective shroud 23 and the cover 25 are connected form-tight to each other. An objective protective part 29 is provided at the portion of the boundary edge 35 at the end of the cover 25 facing away from the ocular 3. A groove 39 is formed also at this contact location. This objective protective part 29 surrounds an objective 5.

Figure 2:
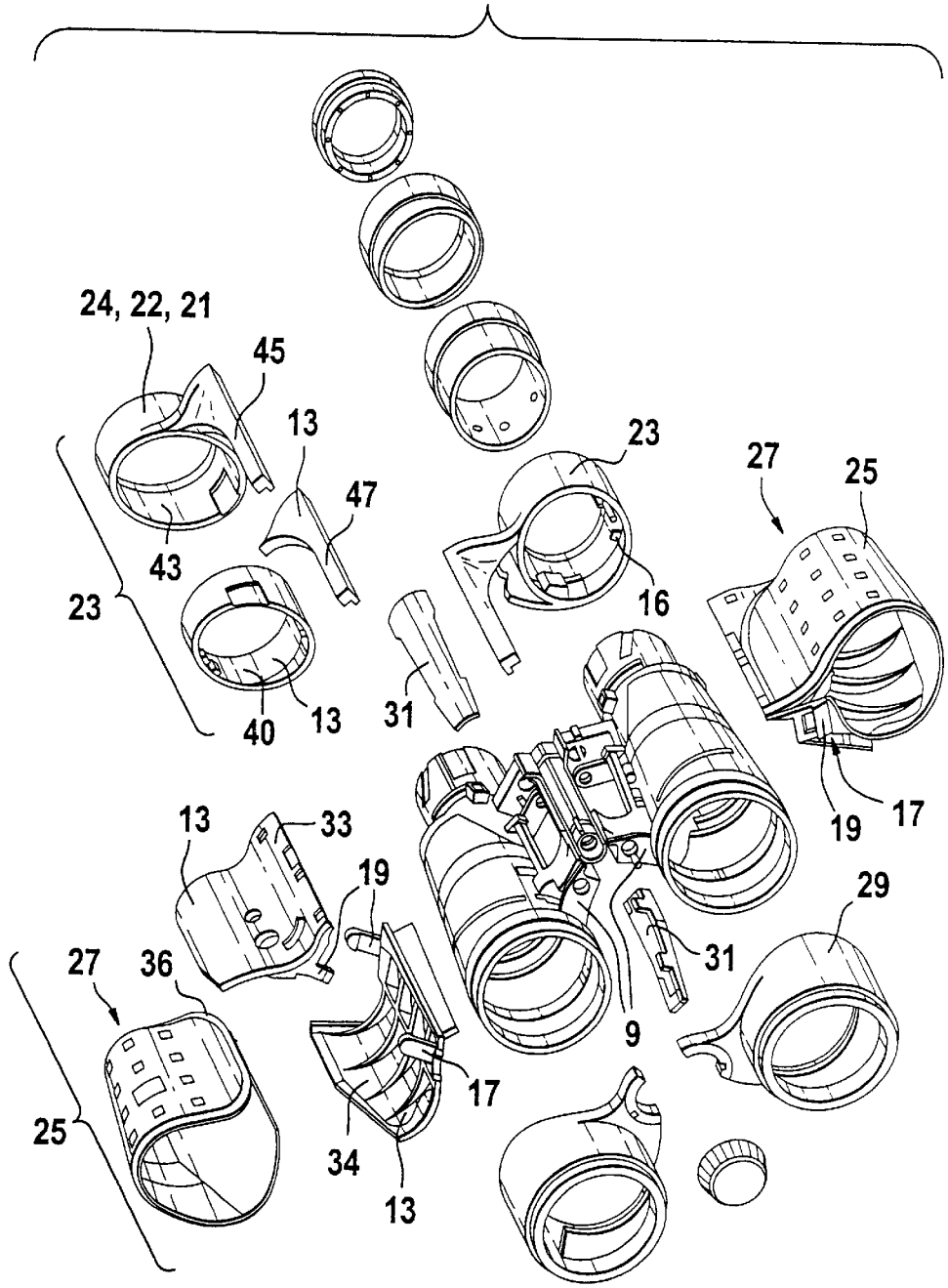
FIG. 2 is an exploded view showing the different parts of the binocular.

A detailed assembly diagram of the housing of the binocular 1 is shown in greater detail in FIG. 2.

In the embodiment shown, the ocular protective shroud 23 includes, inter alia, the covering 24. The covering 24 is a part segment 22 of the outer skin 21. This covering 24 accommodates two structural parts 13 which are made of a hard material. A first annular-shaped structural part 40 is cast into the closed part 43 of the covering 24. The covering 24 includes an appendage 45 to which the second structural part 47 is assigned. This second structural part 47 is cast into the appendage 45. This appendage 45, which is provided with structural part 47, latches into the structural part 33 on the upper side of one of the base bodies 9 of the binocular. This structural part 33 is part of the cover 25.

FIG. 4 is an exploded view showing the cover 25 with its structural parts 33 and 34, the ocular protective shroud 23 and the base body 9 corresponding thereto.

Figure 5:
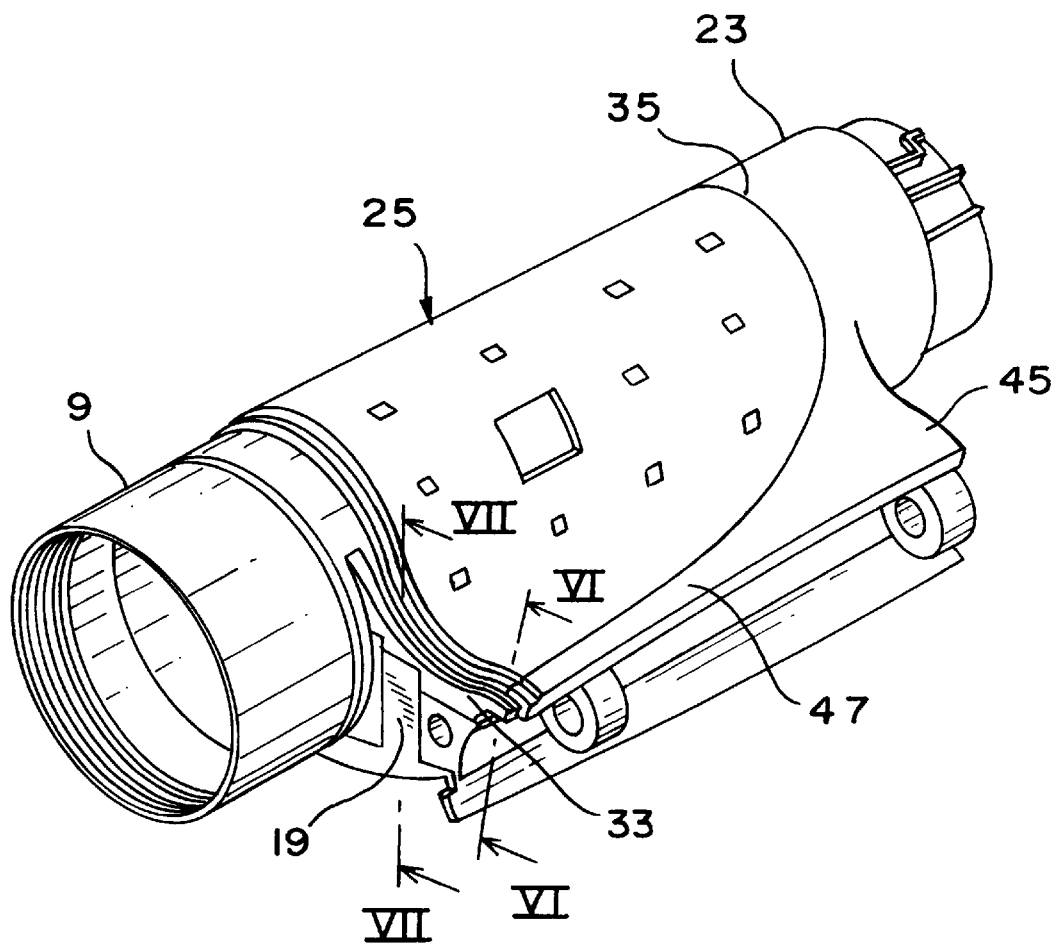
FIG. 5 is a perspective view showing the cover unit and ocular protective shroud mounted on the base body.
Figure 6:
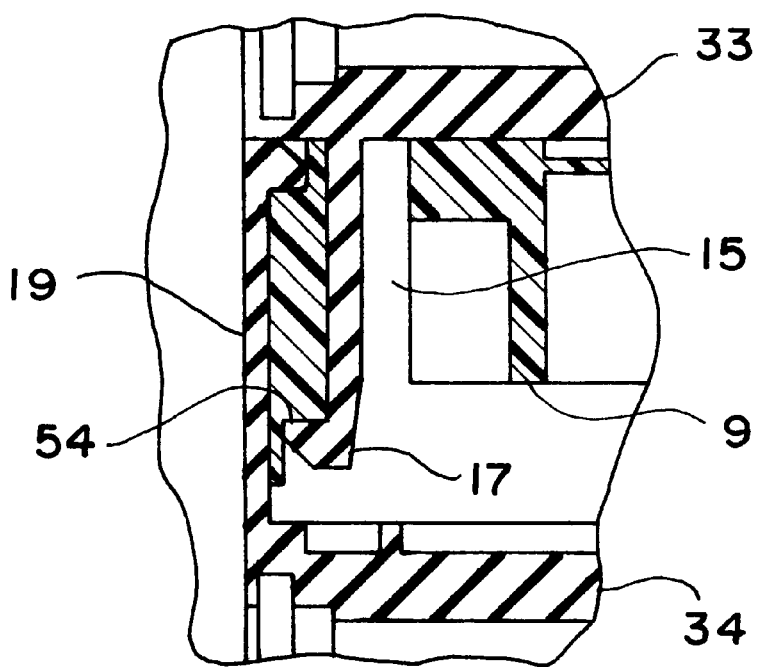
FIG. 6 is a section view taken along line VI—VI showing how a structural part of the shroud is connected to a structural part of the cover; and, FIG. 7 is a section view taken along line VII—VII of FIG. 5 showing how the latching elements of the structural parts of the cover engage the corresponding base body.

FIG. 5 is a perspective view showing the cover 25 and the ocular protective shroud 23 mounted on one of the two base bodies 9. FIG. 6 is a section view taken along line VI—VI of FIG. 5 and shows how the second structural part 47 of the ocular protective shroud 23 latches into the structural part 33 of the cover 25. Each of the hooks 50 formed on the second structural part 47 engages in a corresponding opening 52 formed in the structural part 33 of cover 25.

The cover 25 extends to ocular protective shroud 23. This cover 25 can have a color different from that of the ocular protective shroud 23.

The binocular 1 includes two base bodies 9 conjointly defining a pivot axis 7. This hinge or pivot axis 7 is surrounded by shells 31. The shells 31 are held by the two structural parts (33, 34) of the cover 25.

Figure 7:
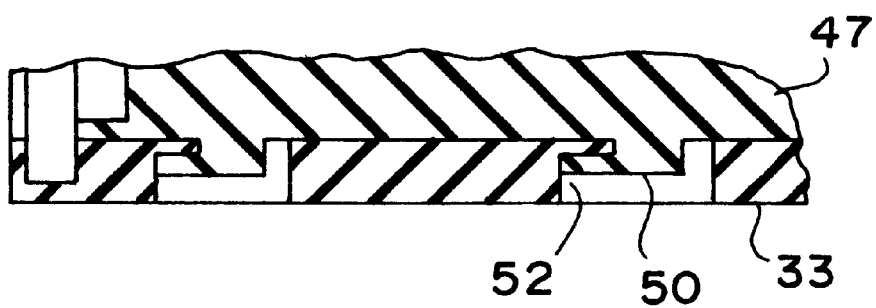

The cover 25 with the two structural parts (33, 34) thereof is formed as one piece with latch hooks 17 and 19. The latch hooks 17 latch into cutouts 15 formed in the base body 9 and latch hooks 19 into corresponding steps 54 formed on the base body 9 as all shown in the detail section view of FIG. 7.

Figure 3:
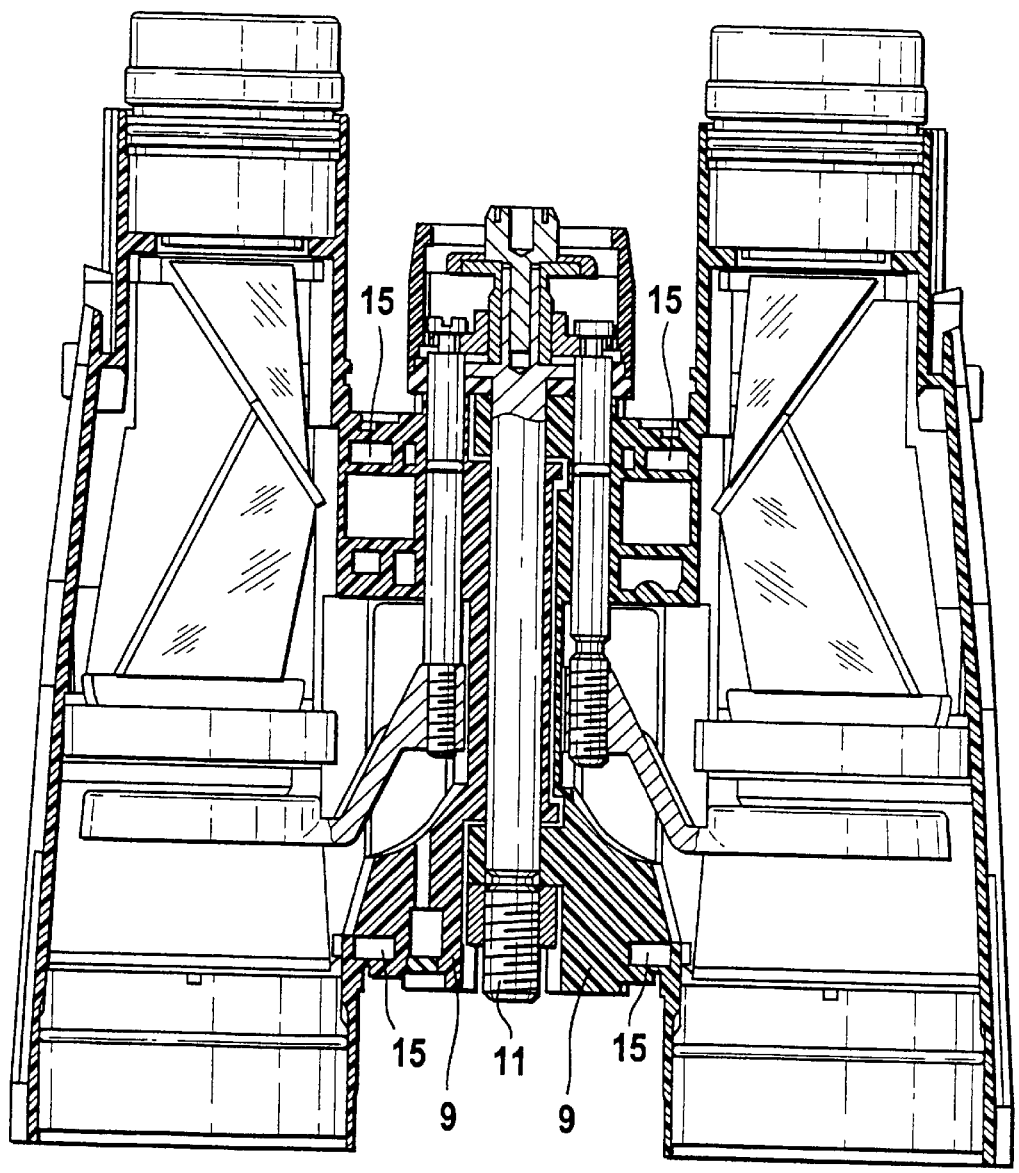
FIG. 3 is a section view of the binocular of FIG. 1.

FIG. 3 also shows the cutouts 15 formed in the base body 9 which are provided for the latch hooks 17.

The structural part 33 of cover 25 is overlapped, in part, by the appendage 45 of the ocular protective shroud 23. The covering 24 of the shroud 23 comes into contact with the cover 25 at the boundary edge 35. A groove 37 (FIG. 1) is formed at the boundary edge. The visible surface in the groove is formed by an understep 36 formed as one piece with the cover. With the understep 36, it is ensured that the base body 9 of the binocular 1 is completely covered.

The cover 25 has a boundary edge which is arranged on the side of the cover 25 facing away from the ocular 3 and is also formed with an understep 36. An objective protective element 29 comes into contact with the boundary edge of the cover 25 and is arranged at the objective end. A groove 39 is formed between the objective protective element 29 and the cover 25. With the covering 24, the cover 25 and the objective protective element 29, an outer skin 21 is formed which completely encases the binocular.

The optical elements of the binocular such as prisms and lenses are mounted in the base body 9. The base body 9 is made of a solid material so that the optical elements are protected against damage. The outer skin 21 is made of a soft material and therefore contributes to attenuating impacts.

It is understood that the foregoing description is that of the preferred embodiments of the invention and that various changes and modifications may be made thereto without departing from the spirit and scope of the invention as defined in the appended claims.

What is claimed is:

1. A housing for a binocular having a base, the housing comprising:

an outer skin;

a latching mechanism for securing said outer skin to said base;

said outer skin including several segments;

at least a first one of said segments being an ocular protective shroud;

said base including two base bodies arranged side-by-side;

at least a second one of said segments being a cover arranged over a mid region of one of said base bodies;

said shroud and said cover having respective structural parts;

said latching mechanism including a first latching device for latching said structural parts to each other; and, said one of said base bodies having cutouts formed therein and said latching mechanism including a second latching device having latching elements formed on the structural part of said cover and extending into said cutouts, respectively, for fixedly holding said cover to said one base body.

2. The housing of claim 1, said cover including structural parts; and, said latching mechanism including latching elements formed on said structural parts.

3. The housing of claim 1, wherein said structural parts are cast into said cover and said shroud, respectively.

4. A housing for a binocular having two base bodies arranged side-by-side including respective oculars, the housing comprising:

an outer skin for enclosing and protecting said base bodies from unwanted impact;

said outer skin being subdivided into a plurality of segments;

first and second ones of said segments being first and second ocular protective shrouds for respective ones of said oculars;

a third one of said segments defining a first cover for a mid region of one of said base bodies;

a fourth one of said segments defining a second cover for a mid region of the other one of said base bodies;

a first latching device for attaching said first ocular protective shroud to said first cover;

a second latching device for attaching said second ocular protective shroud to said second cover;

a third latching device having first and second interengaging latching parts formed on said first cover and said one of said base bodies for fixedly attaching said first cover to said one base body; and, a fourth latching device having third and fourth interengaging parts formed on said second cover and said other one of said base bodies, respectively, for fixedly attaching said second cover to said other base body.

5. A binocular comprising:

a base including first and second base bodies arranged side-by-side and including first and second oculars, respectively;

an outer skin for protecting said first and second base bodies from unwanted impact; and, a latching mechanism having first and second interengaging latching parts formed on said outer skin and formed on said base, respectively, for fixedly connecting said outer skin to said base.

6. The binocular of claim 5, wherein said first latching part is a prong with a hook formed on the end thereof and said second latching part is an opening formed in said base to snap catch said hook of said prong therein.

7. A binocular comprising:

a base including first and second base bodies arranged side-by-side and including first and second oculars, respectively;

an outer skin for protecting said first and second base bodies from unwanted impact;

a latching mechanism having first and second interengaging latching parts formed on said outer skin and formed on said base, respectively, for fixedly connecting said outer skin to said base;

said outer skin being subdivided into a plurality of mutually abutting segments;

first and second ones of said segments being first and second ocular protective shrouds for respective ones of said oculars;

a third one of said segments defining a first cover for a mid region of one of said base bodies;

a fourth one of said segments defining a second cover for a mid region of the other one of said base bodies;

a first latching device for attaching said first ocular protective shroud to said first cover;

a second latching device for attaching said second ocular protective shroud to said second cover;

said latching mechanism is being a third latching device having first and second interengaging latching parts formed on said first cover and said one of said base bodies for fixedly attaching said first cover to said one base body; and, a fourth latching device having third and fourth interengaging parts formed on said second cover and said other one of said base bodies, respectively, for fixedly attaching said second cover to said other base body.

* * * * *